Oct. 9, 1956 R. B. BLAND 2,766,446
CONTROL MEANS FOR INDICATING AND CONTROL DEVICE
Filed Nov. 23, 1953 5 Sheets-Sheet 1

INVENTOR.
REGINALD B BLAND
BY
Lyon & Lyon
ATTORNEYS

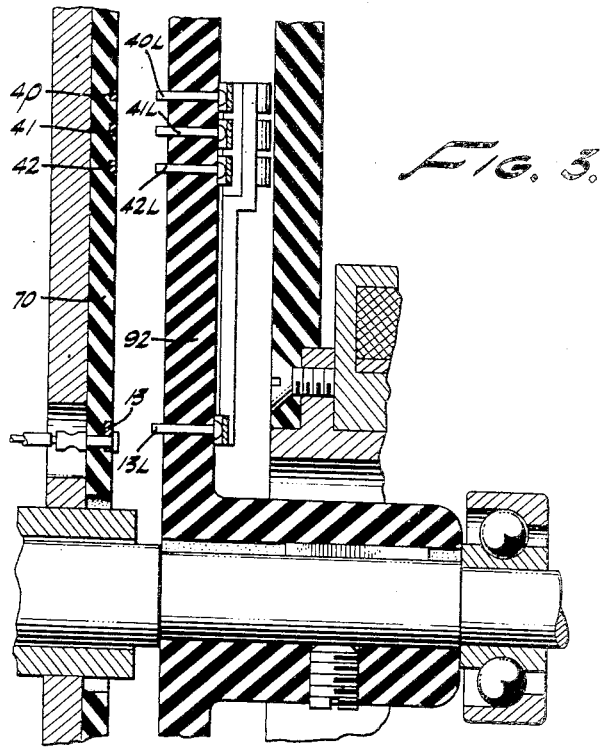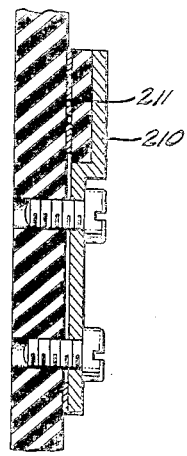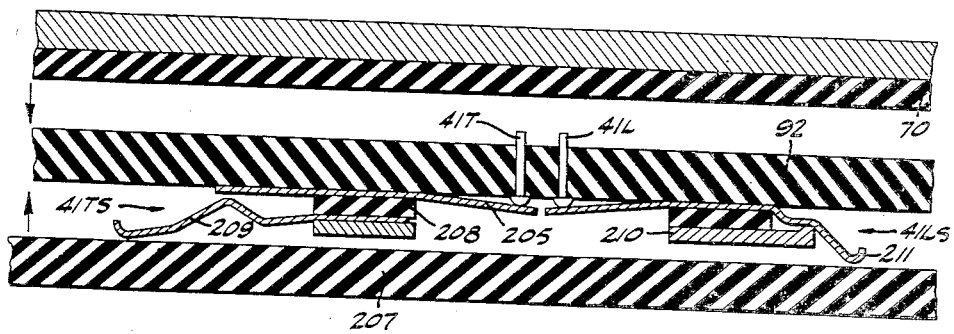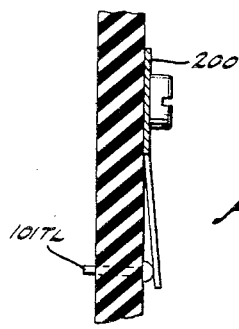

INVENTOR.
REGINALD B. BLAND
BY
ATTORNEYS

United States Patent Office 2,766,446
Patented Oct. 9, 1956

2,766,446
CONTROL MEANS FOR INDICATING AND CONTROL DEVICE

Reginald B. Bland, Los Angeles, Calif.

Application November 23, 1953, Serial No. 393,602

1 Claim. (Cl. 340—345)

The present invention relates to improved means and techniques useful in various systems wherein it is desired to represent, either locally or remotely, the position of an element moved either manually or automatically.

As will be gleaned from the following description, the present invention is universally applicable in systems wherein it is desired to produce indications in either analogue or digital form with respect to movements of an element such as, for example, the movable element of a pressure gauge, range finder or other operating means.

The present invention contemplates the provision of improved means whereby, for example, the angular position of a shaft may be indicated either locally or remotely in terms of numbers, the numbers being used either for indication purposes or for printing, as desired.

Another object of the present invention is to provide an improved follow-up system in which the position of a remotely controlled element is truly representative of the position of an actuated member without the possibility of loss of synchronism between such element and member, as is possible in systems incorporating Selsyn drives.

Another object of the present invention is to provide an arrangement of this character which involves rotary means for producing indications in terms of the angular position of a rotary shaft without the necessity of a commutator.

Another object of the present invention is to provide an arrangement of this character employing leading and trailing brushes so as to obtain a more uniform output signal.

Another object of the present invention is to provide an arrangement of this character in which brushes are movable into engagement with conducting segments on a matrix plate to obtain a reading or indication, with associated means for automatically interrupting the current flowing between such brushes and such conducting segments prior to disengagement of such brushes from such segments to thereby assure long contact life.

Another object of the present invention is to provide an arrangement of this character involving a brush and conducting segments on a matrix plate, with means for moving such brush into engagement with the conducting segments only when a reading or indication is desired.

Another object of the present invention is to provide an arrangement of this character involving a rotary element which requires the application of a relatively small amount of torque, only that necessary to overcome bearing friction, to position that element for obtaining readings or indications in terms of its angular position.

Another object of the present invention is to provide an improved arrangement of this character incorporating a matrix plate which has conducting segments thereon to produce indications of the position of a rotary shaft in terms of coded decimals.

Another object of the present invention is to provide an improved arrangement of the character indicated above, characterized by its simplicity and inexpensiveness.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2:
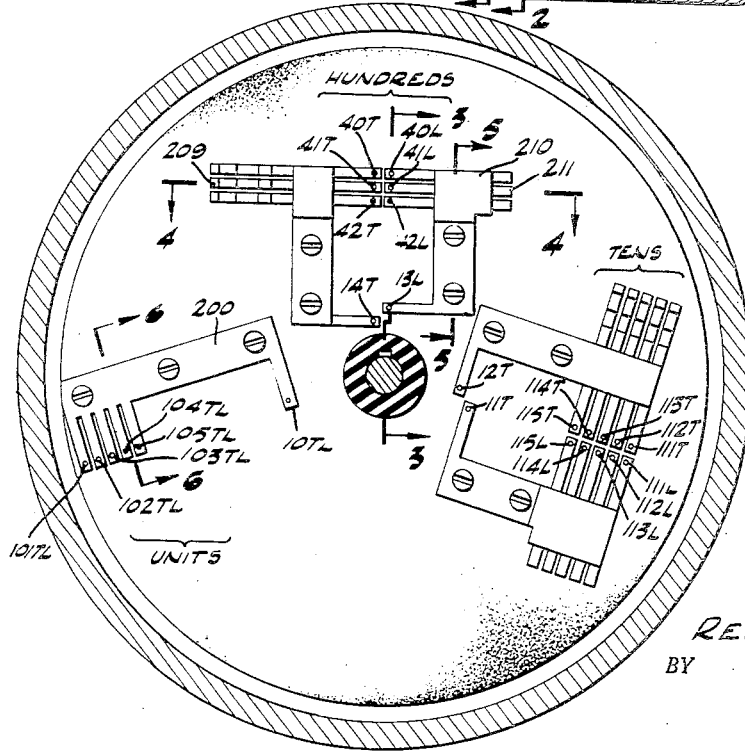
Figure 2 is a view taken in the direction indicated by the line 2—2 in Figure 1.

Figures 3, 4, 5 and 6 are sectional views taken along corresponding lines 3—3, 4—4, 5—5 and 6—6 in Figure 2.

Figure 1:
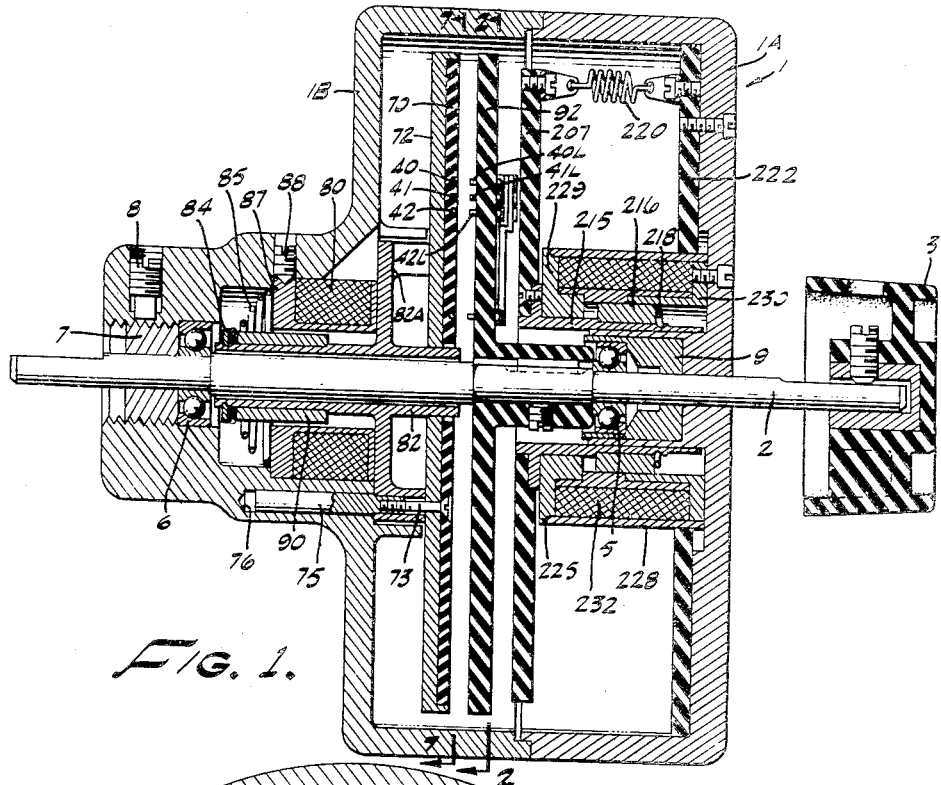
Figure 1 is a longitudinal sectional view through a converter embodying features of the present invention.
Figure 7:
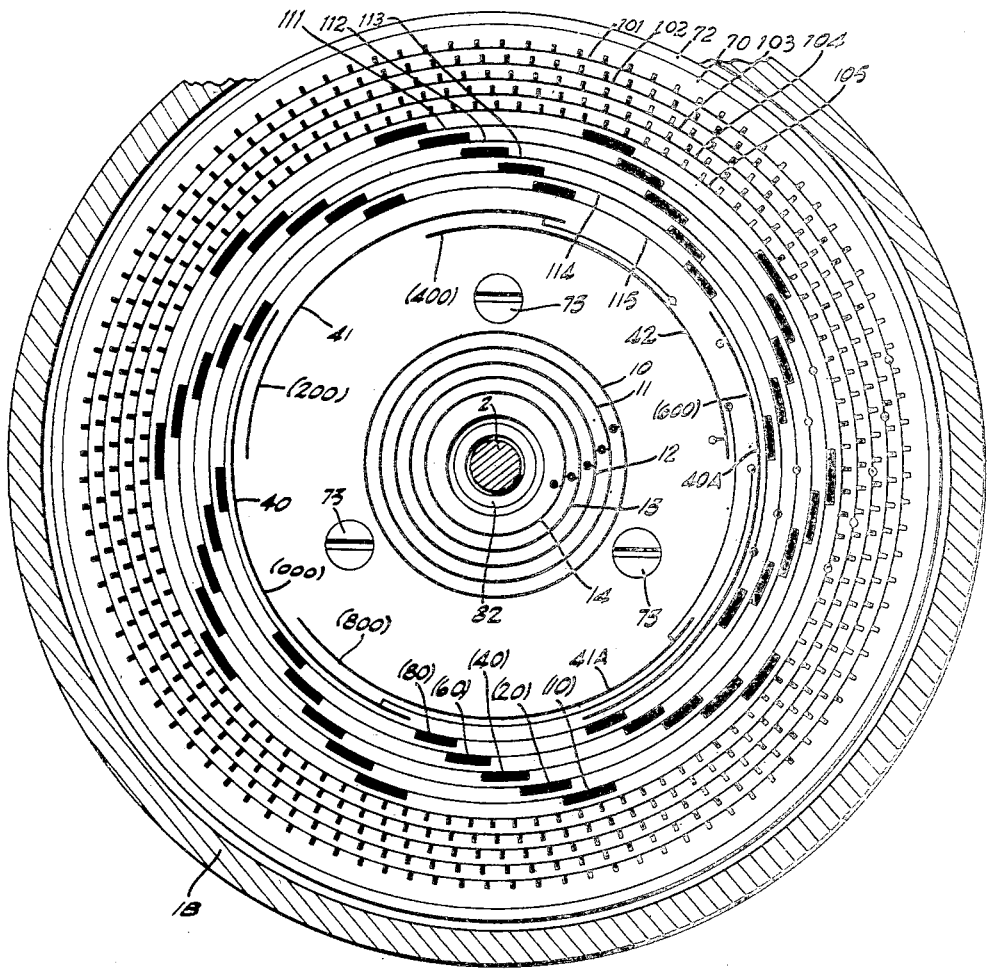

Figure 7 is a view taken in the direction indicated by the line 7—7 in Figure 1.

Figure 8:
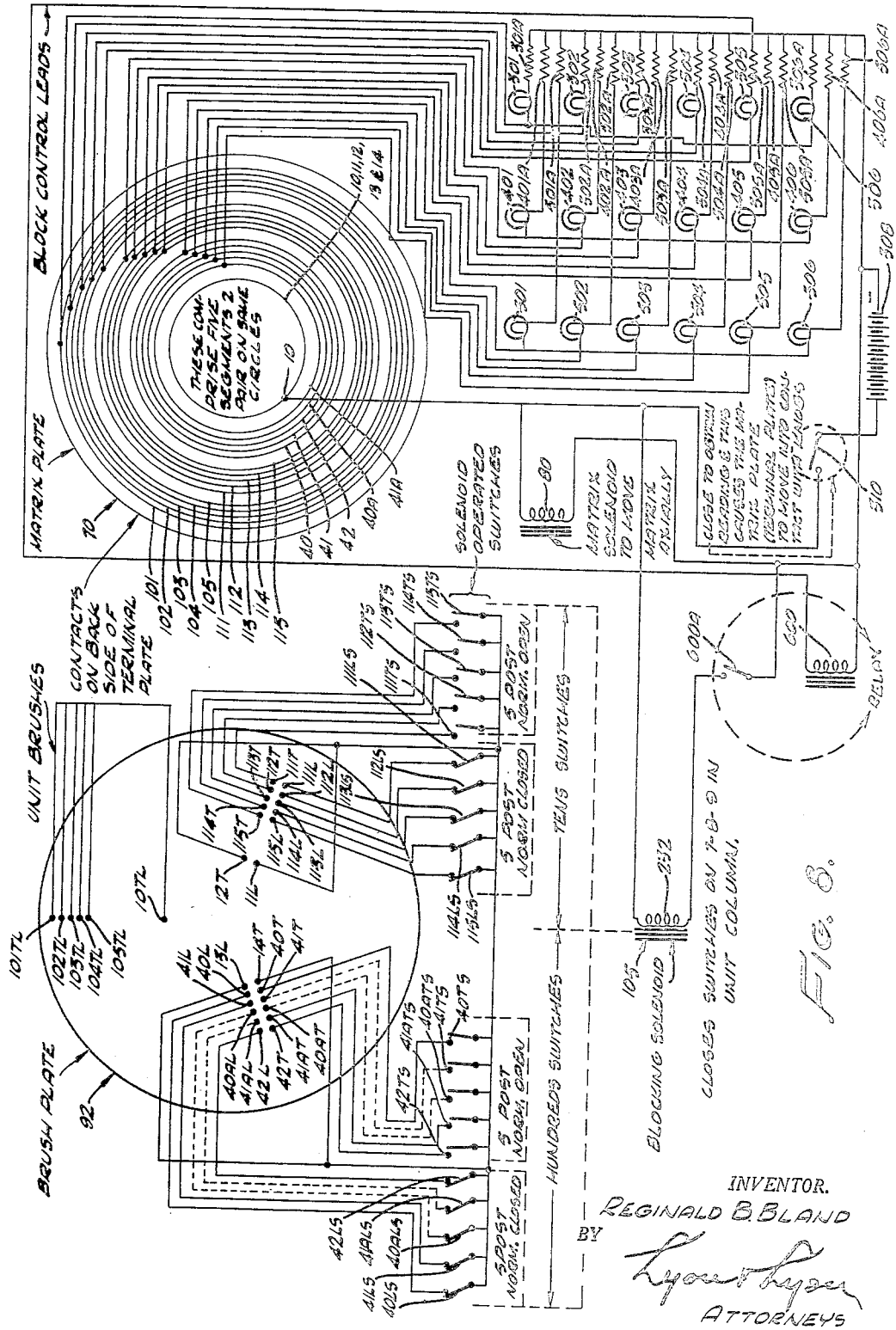

Figure 8 shows, partly in structural and partly in schematic form, an indicating system embodying features of the present invention in which the converter illustrated in Figure 1 is electrically connected.

Figure 9:
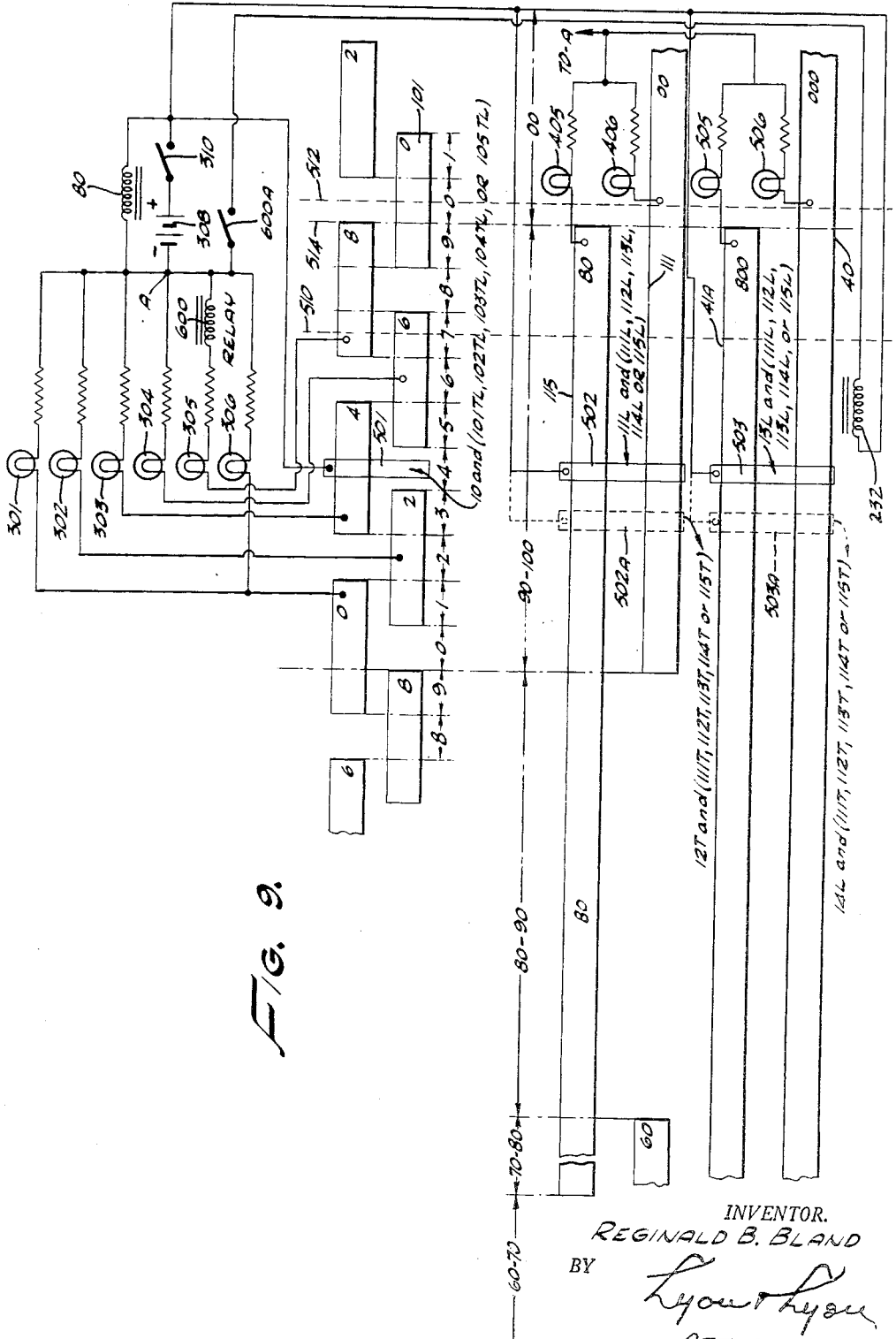

Figure 9 shows, in simplified form, a portion of a system illustrated in Figure 8 for purposes of explaining the manner in which the units, tens and hundreds brush pins are normally aligned and the manner in which the tens and hundreds brush pins are effectively shifted backwardly, using a leading and trailing brush pin arrangement, at the time the digit 7, 8 or 9 is indicated so as to assure accurate indications in the tens and hundreds columns at all times.

In the following description of the invention, the mechanical features of the converter illustrated in Figures 1–7 are first described and then the manner in which such converter is connected electrically is described in connection with Figure 8.

*Description of converter illustrated in Figures 1–7*

The converter incorporates a housing 1 comprising the two casing halves 1A and 1B in which the rotary shaft 2 is journaled. One end of such shaft 2 is adapted to be connected to a trailing device such as, for example, a range finder, a pressure gauge and the like, although as illustrated herein, a manually operated knob 3 is affixed to such shaft 2 to produce the desired rotation of the shaft 2.

The complementary casing halves 1A and 1B have mounted therein ball bearing structures 5 and 6, respectively, with inner and outer race members. The shaft 2 extends through the aligned inner-race ways and the shaft 2 is provided with shoulders which abut the corresponding inner-race ways of the bearings 5 and 6. The bearing 6 is maintained in adjacent position by the plug 7 threaded in the hub of the casing half 1B, such plug being locked in adjusted position by the set screw 8 threaded in the hub. The outer race member of the bearing 6 is snugly received within an annular bore in the casing half 1B.

The outer race of the bearing 5 is likewise snugly received within the collar 9 which is recessed within an annular flange of the casing half 1A.

A matrix plate or disk 70 with conducting segments thereon, as illustrated in Figure 7, is mounted on the shaft 2 for movement in the axial direction of the shaft but is prevented from rotating with the shaft, using the structure now described.

The matrix plate 70 is recessed in the flanged disk 72 serving as a backing plate. The matrix plate 70 and disk 72 are secured together as a unit by three recessed machine screws 73 (Figures 1 and 7) which are threaded in cylindrical guide pins 75. Such guide pins 75 are slidable in slightly oversized bores 76 in the casing half 1B to provide guided axial movement of the matrix plate 70 and, of course, preventing rotation of the matrix plate. The matrix plate 70 and backing plate 72 are moved by solenoid structure which includes the solenoid winding 80. For this purpose, the backing plate 72 is secured on the sleeve 82 which is slidable on the shaft 2. One end of the sleeve 82 is provided with a retaining ring 84 serving as an abutment for one end of the prestressed coil compression spring 85 which has its other end abutting against an annular solenoid coil form 87. The coil form 87, as shown, comprises a ring having a U-shaped cross section and such ring is affixed to the casing half 1B by the locking screw 88. The coil spring 85 thus normally biases the backing plate 72 and the attached matrix plate 70 to the left in Figure 1 to a position as shown wherein the annular flange 82A of the sleeve 82 abuts the coil form 87.

The sleeve 82 also mounts the annular magnetizable sleeve 90. This magnetizable sleeve 90 has one of its ends abutting a shoulder on the sleeve 82 and the other one of its ends retained by the retaining ring 84. When current flows through the solenoid winding 80, the magnetizable sleeve 90 is moved to the right in Figure 1 to move the matrix plate 70 axially so as to move conducting segments thereon into engagement with brushes mounted on the disk 92. This disk 92 thus serves as a stop member for movement imparted to the matrix plate 70 by the solenoid 80.

While the disk 92 is keyed to the shaft 2 for rotation therewith, it is contemplated that, at the time the matrix plate 70 is moved into engagement with the brushes on the disk 92, the shaft 2 and the disk 92 are stationary. In other words, it is contemplated that the solenoid 80 be energized only when the shaft 2 is stationary so as to derive information, using means and techniques described hereinafter, useful in characterizing the particular angular position of the shaft 2.

The matrix plate 70, as shown in Figure 7, comprises a central apertured disk upon one face of which is disposed conducting portions. These conducting portions are represented in black in Figure 7 and comprise conducting rings and segments, certain segments being in conductive relationship to corresponding conducting rings.

The conducting rings and segments on the matrix plate may be applied using well known techniques, particularly those used in providing so-called printed electrical circuits.

Specifically, the conducting segments on the matrix plate 70 include a first series of five concentric rings 101, 102, 103, 104 and 105; a second series of five conducting rings 111, 112, 113, 114 and 115; a pair of diametrically spaced arcs 40 and 40A both having the same radius; a pair of diametrically opposite arcs 41 and 41A each having the same radius; a conducting arc 42; a unit ring 10, a so-called tens lead ring 11, a so-called tens trailing ring 12, a so-called one hundreds lead ring 13, a so-called one hundreds trailing ring 14; with conducting segments on the first series of circles 101–105 and with conducting segments on the second series of circles 111–115. These conducting circles and conducting arcs are connected to different electrical leads as represented by the small circles in Figure 7 so as to provide connections shown in Figure 8. These leads are in the form of flexible pigtails of wire of very small diameter, the leads being sufficiently resilient to allow the above-described axial movement of the matrix plate 70. The first series of conducting rings 101–105 are termed so-called units rings and it is observed that the conducting segments which extend radially from the rings are staggered circumferentially. The second series of circles 111–115 are termed so-called tens rings and each is connected electrically to spaced segments. The segments on different rings are staggered circumferentially as shown.

The disk 92 carries brushes in the nature of spring biased pins for contacting the various segments on rings 101–105, and for contacting the arcs 40, 40A, 41, 41A and 42. The nature of these brushes is illustrated in detail in Figures 2–6.

It is observed that the pin brushes 101TL, 102TL, 103TL, 104TL and 105TL, respectively, are positioned to engage the spaced segments on the corresponding rings 101–105. Likewise, the so-called leading brush pins 111L–115L, as well as the brush pins 111T–115T are positioned to engage the spaced segments on the corresponding tens rings 111–115. Similarly, the brush pins 40L and 40T are positioned to contact either the arc 40 or 40A, such arcs being on the same circle. Also, the brush pins 41L and 41T are positioned to contact either segments 41 or 41A, such segments 41 and 41A having the same radius. Further, the brush pins 42L and 42T are arranged to contact the segment 42. The brush pins 10TL, 11L, 12T, 13L and 14T are arranged to contact, respectively, the contact rings 10, 11, 12, 13 and 14, all of which are maintained at the same potential as described hereinafter.

It is thus observed that the various brush pins have the same reference numeral as the corresponding conducting ring on the matrix plate 70 but each brush pin is distinguished by a different letter, either T, L or TL. The letter L is used to denote a so-called leading brush pin, the letter T is used to designate a so-called trailing brush pin, and the letters TL used together signify both a trailing and leading function. Thus, in general, three series of brushes are provided, namely, a first series of brushes which are leading brushes, a second series of brushes which are trailing brushes and a third series of brushes which cooperate with such leading and trailing brushes, depending upon which one is rendered effective.

Each of these brushes constitute pins of the type shown in Figures 3, 4 and 6, extending through oversized bores in the insulated disk 92, such pins being all biased in the direction of the matrix plate 70 by cantilever supported spring elements. Thus, as shown in Figure 2, the brush pins 101TL—102TL and 10L are spring biased by corresponding spring fingers each having their base integrally formed with a base portion 200 which is secured by means of screws to the back side of the disk 92.

The brush pins 40T, 41T, 42T, 40L, 41L and 42L are spring biased in like manner, as shown in Figure 4. The structure shown in Figure 4 for biasing the brush pins 41L and 41T is typical not only of the structure for biasing the other brush pins, including the brush pins 111L—114L and 111T—115T, but also typifies the structure of the associated switches. Thus in Figure 4 the brush pin 41T is urged upwardly by the cantilever supported spring element 205 having its base portion secured to the disk 92. This spring element 205 extends to the left to form one contact of the normally open switch 41TS. The other element of such normally open switch 41TS is a cantilever supported spring element 209 which extends rearwardly for engagement with the insulated pressure plate or disk 207 which is operated as described later. The strip of insulating material 208 is sandwiched between the elements 205 and 209. The spring element or pin brush 41L is likewise a cantilever supported spring element which is clamped at a point intermediate its ends to the disk 92 with a portion 211 thereof extending to constitute a movable element of the normally closed switch 41LS, the other element of normally closed switch 41LS, constituting the stationary bar 210 secured to the plate 92. It is observed that the various switches associated with the different brush pins have the same reference numeral but have the letter S appended thereto. Thus, the switch associated with the pin brush 41T has the reference numeral 41TS and the switch associated with the pin brush 41L has the reference numeral 41LS.

The switches 40TS, 41TS, 42TS, 111TS, 112TS, 113TS, 114TS and 115TS, as shown in Figure 8, are normally open switches. The switches 40LS, 41LS, 42LS, 111LS, 112LS, 113LS, 114LS and 115LS are normally closed switches. These series of normally open and normally closed switches having the reference letter S appended thereto, as will be described later, are operated only when a special condition exists, namely, when the last digit or units digit is either a 7, 8 or 9.

Physical means for actuating such switches is now described and includes solenoid operating means moving the normally spring biased insulated pressure plate 207.

The pressure plate or disk 207 is affixed, as shown in Figure 1, to an annular flange on the sleeve 215, such sleeve being slidably mounted on an annular hub of the casing half 1A. Such sleeve 215 carries an annular magnetizable cylinder or armature 216 which is disposed between a shoulder on the sleeve and the annular retaining ring 218.

The pressure plate 207 is biased to the right in Figure 1 by three prestressed coil tension springs 220, each having one of its ends attached to the pressure plate 207 and the other one of its ends attached to the annular mounting plate 222 secured to the casing half 1A. These springs 220 thus normally urge the flange on sleeve 215 in contact with the solenoid housing 225, which is secured to the casing half 1A. Such solenoid housing includes the elements 228, 229 and 230, all secured together as, for example, by brazing or soldering with, of course, the solenoid coil 232 in place. The armature 216 is slidably mounted in the annular solenoid housing and moves to the left, when the winding 232 is energized, to move the pressure plate 207 to cause the aforementioned normally open and normally closed switches to be operated as a unit. The motion of the armature 232 is limited by its engagement with the solenoid housing element 229.

Thus, normally, with the solenoid windings 80 and 232 de-energized, the elements assume the positions shown in Figure 1. When a reading is desired, the solenoid winding 80 is energized to move the matrix plate 70 in the axial direction of the shaft 2, whereby the conducting segments on the matrix plate are brought into contact with the brush pins on the insulated disk 92. As will be described later, in the event that the reading contains a numeral 7, 8 or 9 in the so-called units column, the solenoid winding 232 is automatically energized to move the pressure plate 207 in the axial direction of the shaft 2 to cause the series of normally open and normally closed switches on the back of the insulated disk 92 to be operated.

*Description of electrical circuitry illustrated in Figure 8*

In Figure 8, the five outer contact rings 101–105 of the matrix plate 70, i. e., the so-called units rings, are connected, respectively, to one terminal of the indicating lamps 301, 302, 303, 304 and 305, respectively, the other terminals of such indicating lamps being returned to the negative terminal of voltage source 308 through corresponding resistances 301A, 302A, 303A, 304A, and 305A. Thus, the matrix plate and associated brushes are illustrated as controlling the energization of translating means which is in the form of indicating lamps. It is noted that the terminal of resistance 305 is returned to the negative terminal of source 308 in a special manner to perform a blocking function as described in detail later; namely, one terminal of resistance 305A being connected to one terminal of lamp 305 and the other terminal of resistance 305A being returned through the relay winding 600 to the negative terminal of source 308. Thus, indicating lamps 301, 302, 303, 304 and 305 represent respectively, as qualified below, the units digit 0, 2, 4, 6 and 8, respectively. The 6 indicating lamp 306, also representing the numeral 0, is connected in parallel with the other 0 lamp 301, one terminal of the lamp 306 being connected to one terminal of lamp 301 and the other terminal of lamp 306 being connected to the negative terminal of source 308 through resistance 306A.

Illumination of single lamp 301, 302, 303, 304, 305 and 306 corresponds to the corresponding even digit, i. e., 0, 2, 4, 6, 8, 0. Illumination of two adjacent lamps in the column serves as indication of the odd number that lies between the two even numbers. Thus, when the 0 and 2 lamps 301 and 302 are energized simultaneously, the number 1 is indicated; likewise, when the lamps 302 and 303 are simultaneously energized, the numeral 3 is indicated.

The lamps in the second column, namely, lamps 401, 402, 403, 404, 405 and 406 represent the numerals 00, 20, 40, 60, 80 and 00, respectively. When one of such lamps 401–406 is illuminated, the corresponding numeral is designated, and when two adjacent lamps are energized, the odd number multiplied by ten is indicated. Thus, for example, when the lamps 401 and 402 are simultaneously illuminated, the numeral 10 is indicated, and when lamps 403 and 404 are simultaneously illuminated, the numeral 50 is indicated. The lamps 401, 402, 403, 404 and 405 each have one of their terminals connected to a corresponding one of the matrix plate conducting rings 111, 112, 113, 114 and 115, the other terminals of the corresponding lamps being returned to the negative terminal of source 308 through resistances 401A, 402A, 403A, 404A and 405A, respectively. The lamp 406 has one of its terminals connected to one terminal of lamp 401 and the other terminal of lamp 406 is connected to the negative terminal of source 408 through resistance 406A.

The lamps in the third column, namely, lamps 501, 502, 503, 504, 505 and 506 correspond, respectively, to the numerals 000, 200, 400, 600, 800 and 000. These lamps when illuminated individually indicate the corresponding numeral, but when two adjacent lamps are illuminated, the numeral intermediate therebetween is indicated. Thus, when the lamps 501 and 502 are simultaneously energized, the numeral 100 is indicated, and when the lamps 502 and 503 are simultaneously illuminated, the number 300 is indicated.

The lamps 501, 502, 503, 504, and 505 each have one of their terminals connected to corresponding segments 40, 40A, 41A, 41 and 42, the other terminals of such lamps being connected through corresponding resistances 501A, 502A, 503A, 504A and 505A to the negative terminal of source 308. Lamp 506 has one of its terminals connected to one terminal of lamp 501 and the other one of its terminals connected through resistance 506A to the negative terminal of source 308. Since the conducting rings 10, 11, 12, 13 and 14 are continuous rings and are maintained at the same potential, they are all represented by a single circle in Figure 8 for simplicity, such conducting rings being connected to one terminal of the matrix solenoid winding 80, to one terminal of the so-called blocking solenoid winding 232 and to one terminal of the manually operated operating switch 310. The other terminal of the switch 310 is connected to the positive terminal of source 308. The other terminal of solenoid winding 80 is returned to the negative terminal of source 308 and the other terminal of the solenoid winding 232 is returned through the relay switch 600A to the negative terminal of source 308. The winding 600 of such relay for actuating the normally open switch 600A has one of its terminals connected to the negative terminal of source 308 and the other one of its terminals connected to one terminal of resistance 305A so that whenever current flows through the indicating lamp 305, the same current flows also through the relay winding 600 to cause operation of switch 600 for a blocking purpose.

Since the relay winding 600 is serially connected with the lamp 8 and such lamp 8 is used to indicate not only the unit 8 but also the units 7 and 9 the relay winding 600 is energized when either 7, 8 or 9 is indicated to cause the blocking solenoid 232 to be energized to in turn cause operation of the series of normally open and series of normally closed switches mounted on the back side of the brush plate 92.

Normally when a unit digit other than 7, 8 or 9 is indicated, the blocking solenoid winding 232 is not energized and the series of so-called tens switches and hundreds switches are in the position illustrated in Figure 8, in which case the leading brush pins 40L, 41L and 42L are interconnected with the leading tens brush pins 111L, 112L, 113L, 114L and 115L.

On the other hand, when the blocking solenoid 232 is energized, the series of normally closed switches are opened and the series of normally open switches are closed to correspondingly disconnect the leading brushes and to interconnect the trailing hundreds brushes with the trailing tens brushes.

It is observed that while Figure 8 shows additional brush pins 40AL, 41AL, 41AT and 40AT interconnected by dotted lines to additional switches 40ALS, 41ALS, 41ATS and 40ATS, these additions shown in dotted lines are for purposes of explanation only and are of course not included in the actual structure shown in Figure 2, these additional brush pins and additional switches shown in dotted lines being added since there are corresponding contact segments 40, 40A and 41, 41A.

Figure 9 illustrates in simplified form the manner in which the brush pins are aligned in the physical structure illustrated in Figures 1–7. For purposes of simplification, the digits segments, the tens arcs and the hundreds arcs are shown staggered and the units brushes are represented by a composite conducting bar 501; the tens brushes by a composite conducting bar 502; and the hundreds brushes by the conducting bar 503. Actually, the conducting bar 501 represents the brush pin 10 and (101TL, 102TL, 103TL, 104TL or 105TL depending upon the particular angular position of the rotatable shaft 2) as shown in Figure 9 actually the conducting bar 501 corresponds to the brush pins 10 and 103TL since the segment corresponding to the digit 4 is contacted as shown in Figure 9.

Likewise, the conducting bar 502 in Figure 9 represents generally the brush pins 11L and (111L, 112L, 113L, 114L or 115L depending upon the angular position of the shaft 2), actually as shown in Figure 9 the conducting bar 502 represents, assuming the angular position of the shaft 2 as indicated, the brush pins 11L and the brush pins 111L and 115L since the arcs corresponding to 80 and 00 are being contacted.

Similarly, the contact bar 503 represents generally the brush pins 13L and (111L, 112L, 113L, 114L or 115L depending upon the angular position of the shaft 2) actually as represented in Figure 9, assuming the angular position of the shaft 2 as indicated, the contact bar 503 in such special case represents the brush pins 13L, 111L and 115L since the contact segments 800 and 000 are contacted.

It is observed that the contact bars 501, 502 and 503 are aligned. It is also observed that the contact bars 502 and 503, shown in full lines, correspond to leading brush pins while the corresponding trailing brush pins are represented by the contact bars 502A and 503A, respectively, illustrated in dotted lines. As shown in Figure 9, indication is produced on the lamps 505, 506, 405, 406 and 303 indicating, by their illumination, the numeral 9, 900 and 94, it being remembered simultaneous illumination of the lamps 405 and 406 represent the numeral 70. Assuming that the shaft 2 has an angular position displaced a small amount from that illustrated in Figure 9, i. e., the condition exists wherein the contact bars 501, 502 and 503 are axiallay aligned along the line 510, then in such case the contact bar 501 engages the contact segments 6 and 8 simultaneously; the contact bar 502 continues to engage the contact segments 111 and 115; and the contact segments 40 and 41A are still contacted by the contact bar 503. In such case, the lamps 505 and 506 still indicate the numeral 900, the lamps 405 and 406 still indicate the numeral 90, but the lamps 304 and 305 are illuminated to indicate the numeral 7. Apart from this new indication, the blocking solenoid 232 is now energized since the relay winding 600 as described above is serially connected with the lamp 305 and energization of the relay winding 600 causes the relay switch 600A to be closed to produce energization of the blocking solenoid 232. In such case, as described above, the series of normally closed switches corresponding to the leading brush pins and corresponding to the conducting bars 502 and 503 are rendered ineffective, i. e., such normally closed switches are opened, and the normally open switches are closed, such normally open switches being represented by the conducting bar 502A in the case of the tens brush pins and such normally open switches being represented by the contact bar 503 in the case of the hundreds brush pins. Thus, when the contact bar 501 engages a conducting segment on the 105 conducting ring, i. e., a segment corresponding to the digit 8, the contact bars 502 and 503 are effectively shifted rearwardly a relatively small distance wherein the same hundreds and tens indications are produced. Thus, tens and hundreds readings are derived from the trailing brushes when the last digit in the column is either a 7, 8 or 9, i. e., so long as an 8 contact segment is engaged.

Assuming a further positioning of the contact bar 501 in the position indicated by the line 502 wherein the units contact 501 engages only a segment on the 0 contact ring 101, then in such case immediately when and as such contact bar 501 leaves a conducting segment 105 and contacts an 0 contact segment 101 exclusively, then the relay winding 600 is de-energized to again allow the leading contact bars 502 and 503 to be effective.

This expedient of deriving readings from leading and trailing brush pins automatically depending upon the position units brush pin assures accurate indications, particularly in the transitional zone wherein the digit in the units column changes from a 9 to a 0. This expedient allows larger tolerance in manufacturing the matrix plate since, without this expedient, precise alignment of the edges of the contact segments 105, 115 and 41A along a line represented by the dotted line 415 must exist. Further, this expedient provides a compensating effect for mechanical misalignment and play in the rotary structure and assures accurate readings even though the apparatus is subjected to wear resulting from prolonged use.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

In an arrangement of the character described, a supporting member, a first and a second series of contacts on said supporting member, first and second brush means normally spaced from said supporting member and out of engagement with said first and second series of contacts but arranged to engage the same respectively, solenoid operating means incorporating solenoid winding for moving said supporting member relative to said brush means whereby said first and second brush means contact said first and second series of contact members, first translating means associated with said first series of contacts and said first switch means, second translating means associated with said second series of contacts and said second brush means, a source of current, an operating switch, a first serial circuit including said source, said operating switch and said solenoid, said switch being serially connected with said source and said first and second translating means.

References Cited in the file of this patent

UNITED STATES PATENTS

| 2,385,323 | Williams | Sept. 18, 1945 |
| 2,659,066 | Sayer | Nov. 10, 1953 |
| 2,666,912 | Gow et al. | Jan. 19, 1954 |